(12) United States Patent
Xiao et al.

(10) Patent No.: US 11,095,413 B2
(45) Date of Patent: Aug. 17, 2021

(54) BASE STATION, USER EQUIPMENT AND RELATED METHODS

(71) Applicants: SHARP KABUSHIKI KAISHA, Sakai (JP); FG Innovation Company Limited, New Territories (HK); Fangying Xiao, Shanghai (CN)

(72) Inventors: Fangying Xiao, Shanghai (CN); Shohei Yamada, Sakai (JP); Renmao Liu, Shanghai (CN)

(73) Assignees: FG Innovation Company Limited, Hong Kong (HK); Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 16/343,925

(22) PCT Filed: Nov. 2, 2017

(86) PCT No.: PCT/CN2017/109103
§ 371 (c)(1),
(2) Date: Apr. 22, 2019

(87) PCT Pub. No.: WO2018/082607
PCT Pub. Date: May 11, 2018

(65) Prior Publication Data
US 2020/0059340 A1    Feb. 20, 2020

(30) Foreign Application Priority Data

Nov. 4, 2016    (CN) .......................... 201610974524.X

(51) Int. Cl.
*H04L 5/00*    (2006.01)
*H04W 72/12*    (2009.01)
*H04W 92/10*    (2009.01)

(52) U.S. Cl.
CPC ....... *H04L 5/0053* (2013.01); *H04W 72/1263* (2013.01); *H04W 92/10* (2013.01)

(58) Field of Classification Search
None
See application file for complete search history.

(56) References Cited

U.S. PATENT DOCUMENTS

| 2017/0251500 | A1* | 8/2017 | Agiwal | ............ H04W 72/0413 |
| 2017/0311254 | A1* | 10/2017 | Ly | ..................... H04W 74/0833 |

(Continued)

FOREIGN PATENT DOCUMENTS

| CN | 102124691 A | 7/2009 |
| CN | 102104854 A | 12/2009 |
| CN | 104507108 A | 12/2014 |

OTHER PUBLICATIONS

Tech Playon, "5G NR Logical, Transport, and Physical Channels Mapping", retrieved from http://www.techplayon.com/5g-nr-logical-channels-and-transport-channels-channel-mapping/ (Year: 2018).*

(Continued)

*Primary Examiner* — Jamaal Henson
(74) *Attorney, Agent, or Firm* — Imperium Patent Works

(57) ABSTRACT

The present disclosure provides a method for obtaining supplementary system information, and a corresponding user equipment and a base station. A method in the user equipment according to the present invention comprises: sending a leader sequence to a base station to request supplementary system information; and receiving a reply message from the base station in response to sending of the leader sequence.

15 Claims, 8 Drawing Sheets

(56) References Cited

U.S. PATENT DOCUMENTS

| | | | | |
|---|---|---|---|---|
| 2017/0311285 | A1* | 10/2017 | Ly | H04W 74/0833 |
| 2017/0311290 | A1* | 10/2017 | Adjakple | H04W 4/06 |
| 2018/0035361 | A1* | 2/2018 | Ishii | H04W 48/10 |
| 2018/0279129 | A1* | 9/2018 | Vutukuri | H04W 48/14 |

OTHER PUBLICATIONS

Artza Networks, "LTE Logical Channels", retrieved from https://www.artizanetworks.com/resources/tutorials/lay_2_log.html (Year: 2017).*

Cox, "An Introduction to LTE: LTE, LTE-Advanced, SAE, VoLTE and 4G Mobile Communciations, 2nd Edition", Wiley and Sons Publishing 2014 https://www.oreilly.com/library/view/an-introduction-to/9781118818015/9781118818015c06.xhtml (Year: 2014).*

Holma et al. "LTE for UMTS OFDMA and SC-FDMA Base Radio Access", Wiley and Sons Publishing, 2009 pp. 146-150 (Year: 2009).*

Interdigital Communications, "System Information Acquisition for New Radio Access", R2-166867, 3GPP TSG-RAN WG2 #95-BIS, Kaohsiung, Taiwan, Oct. 10-14, 2016.

Catt, "On-demand System Information Delivery Mechanism", R2-164811, 3GPP TSG RAN WG2 Meeting #95 Gothenburg, Sweden, Aug. 22-26, 2016.

NTT Docomo, "New SID Proposal: Study on New Radio Access Technology", RP-160671, 3GPP TSG RAN Meeting #71 Göteborg, Sweden, Mar. 7-10, 2016.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP TS 36.300 V14.0.0(Sep. 2016).

"3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331 V13.2.0 (Jun. 2016).

U.S. Appl. No. 62/334,706, filed May 11, 2016.

Huawei: "Optimization of System Information Reading Time", 3GPP Draft; R2-062241 Optimization of System Info. Reading Time, 3rd Gen. Partnership Project (3GPP), Mobile Competence Centre; 650, Route des Lucioles; F-06921 Sophia-Antipolis Cedex; France, vol. RAN WG2, Tallinn, Estonia; Aug. 28, 2006-Sep. 1, 2006, Aug. 23, 2006 (Aug. 23, 2006), XP050602776 (4 pages).

LG Electronics Inc: "Other SI delivery in broadcast manner", 3GPP Draft; R2-167050 Other SI Delivery in Broadcast Manner, 3rd Gen. Partnership Project (3GPP), Mobile Competence Centre; 650, Route des Lucioles; F-06921 Sophia-Antipolis Cedex; France, vol. RAN WG2, Kaohsiung, Taiwan; Oct. 10, 2016-Oct. 14, 2016 Oct. 1, 2016 (Oct. 1, 2016), XP051162391 (3 pages).

Nortel et al: "On demand System Information broadcast: Email rapporteur report", 3GPP Draft; R2-070071,3rd Gen. Partnership Project(3GPP), Mobile Competence Centre; 650, Route des Lucioles; F-06921 Sophia-Antipolis Cedex; France, vol. RAN WG2, Sorrento, Italy; Jan. 12, 2007, Jan. 12, 2007 (Jan. 12, 2007), XP050133188 (4 pages).

ZTE: "System Information delivery in NR", 3GPP Draft; R2-165111 System Information Delivery in NR, 3rd Gen. Partnership Project (3GPP), Mobile Competence Centre; 650, Route des Lucioles; F-06921 Sophia-Antipolis Cedex; France, vol. RAN WG2, Gothenburg, Sweden; Aug. 22, 2016-Aug. 26, 2016 Aug. 13, 2016 (Aug. 13, 2016), XP051134126 (6 pages).

Extended European Search Report of the European Patent Office in foreign related application EP17868129.2 dated May 18, 2020 (7 pages).

Office action of the Chinese Patent Office in foreign related application CN201610974524.X dated Mar. 30, 2021.

* cited by examiner

BASE STATION, USER EQUIPMENT AND RELATED METHODS

TECHNICAL FIELD

The present disclosure relates to the field of wireless communication technologies. More specifically, the present disclosure relates to a method for acquiring system information and a corresponding base station and user equipment.

BACKGROUND

A new research project on 5 G technical standards (see non-patent literature: RP-160671: New SID Proposal: Study on New Radio Access Technology) was proposed by NTT DOCOMO in the 3rd Generation Partnership Project (3GPP) RAN #71 plenary session held in March 2016, and was approved. The goal of the research project is to develop a New Radio (NR) access technology to meet all of the application scenarios, requirements, and deployment environments of 5 G, NR mainly has three application scenarios: Enhanced Mobile Broadband Communication (eMBB), massive Machine Type Communication (mMTC), and Ultra Reliable and Low Latency Communication (URLLC). According to the planning of the research project, the standardization of NR is conducted in two stages: the first-stage standardization will be completed by the middle of 2018; the second-stage standardization will be completed by the end of 2019. The first-stage standard specifications need to be forward-compatible with the second-stage standard specifications, while the second-stage standard specifications need to be established on the basis of the first-stage standard specifications and to meet all requirements of 5 G NR technical standards.

For better energy conservation and emission reduction, the initial requirement of the project is to avoid the network repeatedly sending of unnecessary information. This requirement is based on the following consideration:

In existing LTE systems, in order to ensure normal access of LTE user equipment (UE), a base station (which may be marked as eNB or gNB) periodically broadcasts information of an access layer and a non-access layer, which is collectively referred to as system information. In the current LTE systems, the system information is divided into a Master information Block (MIB) and several System information Blocks (SIBs) for carrying different contents; and up to 20 SIBs have been defined by LTE so far. The MIB carries necessary and most frequently sent parameters for acquiring basic information of a cell. SIB1 includes parameters for determining whether a cell is suitable for cell selection and time domain scheduling information of other SIBs. The MIB and the SIB1 are sent in a predefined time period. Other SIBs with a same scheduling period are arranged in a same System Information Message (referred to as SI Message) and are periodically sent in a corresponding system information window (SI-window) according to time domain scheduling information carried in the SIB1. Other than MIB and SIB1, not all SIBs need to be broadcast. According to the features supported by a current access network device and the features of the non-access stratum, the eNB selects a system information block relevant to the features for broadcast. For example, if the current access network supports enhanced access control, the eNB broadcasts SIB14, which carries relevant information of EAB; otherwise, broadcasting is not performed. If the current access network supports a multimedia broadcast multicast service (MBMS), the eNB broadcasts SIB13 and so on. These broadcast SIBs are reflected in the scheduling information carried by the SIB1; and unscheduled. SIBs are not broadcast. Prior to initiating the access, the UE further needs to acquire other SIBs based on its own features in addition to MIB and SIB1 that must be acquired; and then the access is initiated. For example, if the UE supports multiple standards, SIB8 further needs to be read to acquire inter-RAT-related cell reselection information; otherwise, SIBS does not need to be read. If the UE supports WLAN interoperation, SIB17 further needs to be acquired; otherwise, SIB17 does not need to be acquired.

The method of periodic broadcasting of all system information supported by the eNB helps the UE to acquire the corresponding information at any time. However, this method does not consider the acquisition requirements of the UE (for example, only a small number of UEs need to acquire some of the system information); and all system information supported by the eNB is broadcast repeatedly on a specific downlink resource, resulting in low system resource utilization and large energy consumption. At the 3GPP RAN2 #94meeting, some manufacturers proposed to transmit system information by combining network autonomous broadcasting and UE request transmission. Those manufacturers suggested to classify system information into two categories: one type of system information is sent by the eNB autonomously through periodic broadcasting (this type of system information is referred to as minimum broadcast system information or first system information in the present disclosure), and such system information may include parameters required for accessing a cell and/or parameters related to cell selection and/or parameters necessary for acquiring other system information or system information required by most UE; the other type of system information is system information that is not included in the first system information, which is sent only in a specific situation (for example, when a UE request is received or an update is required) (this type of system information is referred to as other system information or second system information or supplementary system information in the present disclosure), and the supplementary system information may be sent by broadcast or multicast or unicast. When the UE needs part or all of the supplementary system information, how to acquire the supplementary system information is a problem to be solved.

SUMMARY OF INVENTION

According to the present disclosure, a method for acquiring supplementary system information and corresponding user equipment (UE) and base station are provided.

According to a first aspect of the present disclosure, a method in user equipment (UE) is provided, including: sending a preamble sequence to a base station to request supplementary system information; and receiving a reply message from the base station in response to the sending of the preamble sequence.

In one embodiment, the preamble sequence includes a plurality of preamble sequences, the plurality of preamble sequences respectively correspond to different system information blocks/system information block groups, and one of the plurality of preamble sequences corresponds to all the supplementary system information; when the UE needs all the supplementary system information, the sending a preamble sequence to a base station comprises selecting the preamble sequence corresponding to all the supplementary system information from the plurality of preamble sequences for sending.

In one embodiment, a corresponding relation between the plurality of preamble sequences and the system information blocks/the system information block groups is predefined or is configured via RRC signaling.

In one embodiment, the reply message indicates an allocated uplink resource, and the UE is authorized to send a system information request message on the uplink resource so as to request the required supplementary system information from the base station.

In one embodiment, the method further includes sending the system information request message on the allocated uplink resource, the system information request message including an identifier indicating that all the supplementary system information is required.

In one embodiment, the system information request message is an RRC message transmitted on an uplink CCCH logical channel or an uplink DCCH logical channel.

In one embodiment, the system information request message includes a UE identifier.

In one embodiment, the UE identifier is an identifier received from an upper layer or a random number generated by the UE.

In one embodiment, the method further includes receiving a system information request response message in response to the sending of the system information request message, where the system information request response message is an RRC message transmitted on a downlink CCCH logical channel or a downlink DCCH logical channel or a downlink BCCH logical channel.

In one embodiment, the system information request response message includes the requested system information block/system information block group.

In one embodiment, the system information request response message indicates that the base station will broadcast the requested system information block/system information block group and the method further includes receiving the broadcast system information block/system information block group.

In one embodiment, the system information request response message indicates scheduling information of the requested system information block/system information block group, and the method further includes receiving the requested system information block/system information block group according to the scheduling information.

According to a second aspect of the present disclosure, user equipment is provided, including: a sending unit configured to send a preamble sequence to a base station to request supplementary system information; and a receiving unit configured to receive a reply message from the base station.

In one embodiment, the preamble sequence includes a plurality of preamble sequences, the plurality of preamble sequences respectively correspond to different system information blocks/system information block groups, and one of the plurality of preamble sequences corresponds to all the supplementary system information; when the UE needs all the supplementary system information, the sending unit is further configured to select the preamble sequence corresponding to all the supplementary system information from the plurality of preamble sequences for sending.

In one embodiment, a corresponding relation between the plurality of preamble sequences and the system information blocks/the system information block groups is predefined or is configured via RRC signaling.

In one embodiment, the reply message indicates an allocated uplink resource, and the user equipment is authorized to send a system information request message on the uplink resource so as to request the required supplementary system information from the base station.

In one embodiment, the sending unit is further configured to send the system information request message on the allocated uplink resource, the system information request message comprising an identifier indicating that all the supplementary system information is required.

In one embodiment, the system information request message is an RRC message transmitted on an uplink CCCH logical channel or an uplink DCCH logical channel.

In one embodiment, the system information request message includes a UE identifier.

In one embodiment, the UE identifier is an identifier received from an upper layer or a random number generated by the user equipment.

In one embodiment, the receiving unit is further configured to receive a system information request response message in response to the sending of the system information request message, where the system information request response message is an RRC message transmitted on a downlink CCCH logical channel or a downlink DCCH logical channel or a downlink BCCH logical channel.

According to a third aspect of the present disclosure, a method in a base station is provided, including: receiving, from user equipment (UE), a preamble sequence requesting supplementary system information; and sending a reply message to the UE in response to the receiving of the preamble sequence.

In one embodiment, the preamble sequence includes a plurality of preamble sequences, the plurality of preamble sequences respectively correspond to different system information blocks/system information block groups, and the sending a reply message to the UE further includes: containing, in the reply message, a system information block/system information block group corresponding to the received preamble sequence.

In one embodiment, the preamble sequence includes a plurality of preamble sequences, the plurality of preamble sequences respectively correspond to different system information blocks/system information block groups, and the sending a reply message to the UE further includes: sending the reply message to the UE, the reply message indicating that the requested system information block/system information block group is to be broadcast; and the method further includes: broadcasting the requested system information block/system information block group.

In one embodiment, the preamble sequence includes a plurality of preamble sequences, the plurality of preamble sequences respectively correspond to different system information blocks/system information block groups, and the sending a reply message to the UE further includes: sending the reply message to the UE, the reply message indicating scheduling information of the requested system information block/system information block group; and the method further includes: sending the requested system information block/system information block group according to the scheduling information.

In one embodiment, different resources are configured to request different system information blocks/system information block groups by the UE, and the method further includes: determining, according to a resource receiving the preamble sequence, the supplementary system information required by the UE.

In one embodiment, the reply message includes an uplink resource allocated to the UE, and the UE is authorized to send a system information request message on the uplink resource so as to request the required supplementary system information.

In one embodiment, the method further includes: receiving, on the allocated uplink resource, the system information request message sent by the UE for requesting the required supplementary system information.

In one embodiment, the method further includes: sending a system information request response message in response to the receiving of the system information request message.

In one embodiment, the system information request response message is an RRC message transmitted on a downlink CCCH logical channel or a downlink DCCH logical channel or a downlink BCCH logical channel.

In one embodiment, the system information request response message includes the requested system information block/system information block group.

In one embodiment, the system information request response message indicates that the requested system information block/system information block group is to be broadcast, and the method further includes: broadcasting the system information block/system information block group.

In one embodiment, the system information request response message indicates scheduling information of the requested system information block/system information block group; and the method further includes: sending the requested system information block/system information block group according to the scheduling information.

According to a fourth aspect of the present disclosure, a base station is provided, including: a receiving unit, configured to receive a preamble sequence requesting supplementary system information from UE; and a sending unit, configured to send a reply message to the UE.

In one embodiment, the preamble sequence includes a plurality of preamble sequences, the plurality of preamble sequences respectively correspond to different system information blocks/system information block groups, and the sending unit is further configured to: contain, in the reply message, a system information block/system information block group corresponding to the received preamble sequence.

In one embodiment, the preamble sequence includes a plurality of preamble sequences, the plurality of preamble sequences respectively correspond to different system information blocks/system information block groups, and the sending unit is further configured to: send a reply message to the UE, the reply message indicating that the requested system information blocks/system information block groups is to be broadcast.

In one embodiment, the sending unit is further configured to: broadcast the requested system information block/system information block group.

In one embodiment, the preamble sequence includes a plurality of preamble sequences, the plurality of preamble sequences respectively correspond to different system information blocks/system information block groups, and the sending unit is configured to: send the reply message to the UE, the reply message indicating scheduling information of the requested system information blocks/system information block groups; and send the requested system information blocks/system information block groups according to the scheduling information.

In one embodiment, different resources are configured to request different system information blocks/system information block groups by the UE, and the sending unit is further configured to: determine, according to a resource receiving the preamble sequence, the supplementary system information required by the UE for sending.

In one embodiment, the reply message includes an uplink resource allocated to the UE, and the UE is authorized to send a system information request message on the uplink resource so as to request the required supplementary system information.

In one embodiment, the receiving unit is further configured to: receive, on the allocated uplink resource, the system information request message sent by the UE for requesting the required supplementary system information.

In one embodiment, the sending unit is further configured to: send a system information request response message in response to the receiving of the system information request message.

In one embodiment, the system information request response message is an RRC message transmitted on a downlink CCCH logical channel or a downlink DCCH logical channel or a downlink BCCH logical channel.

In one embodiment, the system information request response message includes the requested system information block/system information block group.

In one embodiment, the system information request response message indicates that the requested system information block/system information block group is to be broadcast, and the sending unit is further configured to: broadcast the system information block/system information block group.

In one embodiment, the system information request response message indicates scheduling information of the requested system information block/system information block group, and the sending unit is further configured to send the requested system information block/system information block group according to the scheduling information.

BRIEF DESCRIPTION OF DRAWINGS

The above and other features of the present disclosure will become more apparent with the following detailed description in conjunction with the accompanying drawings.

DETAILED DESCRIPTION OF EMBODIMENTS

The following describes the present disclosure in detail with reference to the accompanying drawings and specific embodiments. It should be noted that the present disclosure should not be limited to the specific embodiments described below. In addition, for simplicity, detailed description of the known art not directly related to the present disclosure is omitted to prevent confusion in understanding the present disclosure.

The terms involved in the present disclosure are described below:

PDCCH: Physical Downlink Control Channel;
CCCH: Common Control Channel;
DCCH: Dedicated Control Channel;
BCCH: Broadcast Control Channel;
RRC: Radio Resource Control;
RRC inactive state: The state is a state different from an RRC idle state and an RRC connected state, and UE in this state is based on a notification procedure initiated by a wireless access network (RAN).
MAC CE: Media Access Control Control Element
System information block: Parameters applicable to all UE or to sonic UE are grouped according to a predefined manner (for example, according to functions or according to whether a parameter is applicable to all UE), and each set of parameters is called a system information block, denoted as SIB. For example, neighbor cell related parameters used for cell re-selection is used as a system information block.
System information block group: A set consisting of several system information blocks is referred to as a system information block group, denoted as SI.
System information change period: The system information change period can be used to define that changes in system information can only occur in a specific system frame. That is, according to scheduling of system information, system information may be sent a plurality of times and contains the same content in the system information change period.

If not specifically stated, the system information in this disclosure may be a system information block or a system information block group.

The method for acquiring supplementary system information according to the present disclosure is described below with reference to the drawings.

Embodiment 1

Preamble Sequence/Reply Message

Figure 1:
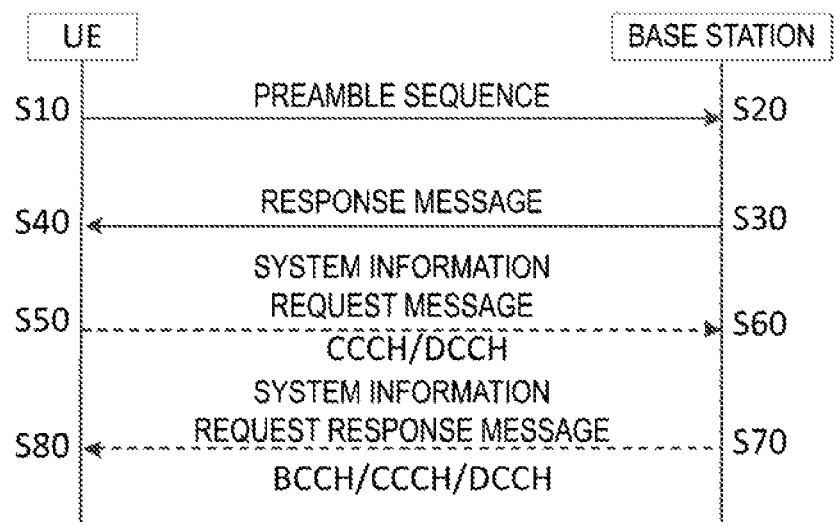
FIG. 1 shows a flowchart of a method for acquiring supplementary system information according to Embodiment 1 of the present disclosure.

FIG. 1 shows a flowchart of a method for acquiring supplementary system information according to Embodiment 1 of the present disclosure.

At step S10, UE sends a preamble sequence to a base station to request supplementary system information.

At step S20, the base station receives the preamble sequence sent by the UE.

At step S30, the base station sends a reply message to the UE.

At step S40, the UE receives the reply message sent by the base station.

The preamble sequence may be a preamble sequence that is predefined or is configured via RRC signaling for requesting supplementary system information.

In one embodiment, one or a set of preamble sequences are predefined or configured via RRC signaling to request supplementary system information. When the UE needs to request supplementary system information, the preamble sequence is sent, or one of the preamble sequences is selected (for example, randomly selected in an equal probability manner) from the preamble sequence set for sending. The preamble sequence or preamble sequence set is referred to as a first preamble sequence in the present disclosure.

In one embodiment, two preamble sequences or two sets of preamble sequences are predefined or configured via RRC signaling for requesting supplementary system information. One of the preamble sequences or one set of preamble sequences is used to request all the supplementary system information. That is, when the UE needs to request all the supplementary system information, the preamble sequence is sent, or one preamble sequence is selected (for example, randomly selected in an equal probability manner) from a corresponding preamble sequence set for sending, and the preamble sequence or the preamble sequence set is referred to as a second preamble sequence in the present disclosure. The other preamble sequence or preamble sequence set is used to request partial supplementary system information. That is, when the UE needs to request a part of the supplementary system information, the preamble sequence is sent, or one preamble sequence is selected (for example, randomly selected in an equal probability manner) from a corresponding preamble sequence set for sending, and the preamble sequence or the preamble sequence set is referred to as a third preamble sequence in the present disclosure.

In one embodiment, the preamble sequence includes a plurality of preamble sequences, the plurality of preamble sequences respectively corresponding to different system information blocks/system information block groups, and the sending a preamble sequence to a base station includes selecting a preamble sequence corresponding to a system information block/system information block group required by the UE from the plurality of preamble sequences for sending. A corresponding relation between the plurality of preamble sequences and the system information blocks/the system information block groups is predefined or is configured via. RRC signaling. The corresponding relation may be that one preamble sequence corresponds to one system information block; for example, a system information block SIB X corresponds to a preamble sequence Y. The corresponding relation may also be that one preamble sequence corresponds to one system information block group; for example, a system information block group N corresponds to a preamble sequence S, and the system information block group N includes system information blocks SIB X1, SIB X2, and SIB X3. It is also possible to predefine or configure, via RRC signaling, a preamble sequence corresponding to all the supplementary system information, that is, one of the plurality of preamble sequences corresponds to all the system information. In this embodiment, a corresponding preamble sequence is selected and sent when the UE requests a system information block or a system information block group or all the supplementary system information. All the supplementary system information described in this disclosure may be all supplementary system information supported by a cell.

In one embodiment, one or more (or one or more sets of) preamble sequences are predefined or configured via RRC signaling, and the UE selects a corresponding number of preamble sequences and sends the selected preamble sequence (or select a preamble sequence from a corresponding preamble sequence set for sending) based on the number of system information blocks or system information block groups required to be requested.

It should be noted that a resource used by the UE to send the preamble sequence may be a resource used by the UE to perform random access or a resource predefined or configured via RRC signaling to send a preamble sequence requesting supplementary system information. If the resource used to send the preamble sequence requesting supplementary system information is different from the resource for random access, the base station can determine whether the UE performs random access or requests supplementary system information front a resource location where the preamble sequence is received. In this case, there is no need to predefine or configure a dedicated preamble sequence to request supplementary system information. Different resources can be configured to request different supplementary system information (i.e., system information blocks/system information block groups). For example, different supplementary system information is mapped to different time-frequency resources. When the UE needs specific supplementary system information, a request (or preamble sequence) is sent over a corresponding time-frequency resource. Accordingly, when receiving the request (or preamble sequence), the base station determines the supplementary system information required by the UE according to the mapping relationship.

Depending on different preamble sequences sent by the UP, reply messages sent by the base station to the UP may also be different.

In one embodiment, the base station sends a reply message corresponding to the first preamble sequence (or the third preamble sequence) to the UP, and the reply message contains an allocated uplink resource (UL Grant) that can be used by the UE to send a system information request message to request the required supplementary system information.

In another embodiment, the base station receives, from the UE, a non-first and non-third preamble sequence (for example, the second preamble sequence), and sends a reply message corresponding to the non-first and non-third preamble sequence (for example, the second preamble sequence) to the UE. Preferably, the base station includes, in the reply message, a system information block/system information block group corresponding to the received preamble sequence. Correspondingly, the reply message received by the UE from the base station includes the requested supplementary system information. Alternatively, the reply message indicates that the supplementary system information requested by the UE is to be broadcast. In this case, the base station will subsequently broadcast the requested supplementary system information, and the UE will perform a process of receiving the broadcast supplementary system information. Alternatively, the reply message indicates scheduling information of the supplementary system information requested by the UP. In this case, the base station will subsequently send the requested supplementary system information according to the scheduling information, and the UE performs a process of receiving the supplementary system information. For example, the UE receives the requested supplementary system information according to the scheduling information.

In another embodiment, the reply message indicates scheduling information of the supplementary system information requested by the UP, the scheduling information being pre-configured via RRC signaling. In this case, the UP receives the requested system information block/system information block group according to the pre-configured scheduling information.

System Information Request Message/System Information Request Response Message

FIG. 1 further shows that at step S50, the UP sends a system information request message to the base station on the allocated uplink resource so as to request the required supplementary system information. At step S60, the base station receives, on the uplink resource allocated to the UE, the system information request message sent by the UE. At step S70, in response to the receiving of the system information request message, the base station sends a system information request response message to the UE. At step S80, the UE receives the system information request response message.

The system information request message indicates the requested supplementary system information. Preferably, the request message indicates an identifier of one or more requested system information blocks. Alternatively, the request message indicates an identifier of one or more requested system information block groups. Alternatively, the request message indicates requesting all the supplementary system information. Alternatively, the request message indicates an identifier of one or more requested system information blocks and/or an identifier of one or more requested system information block groups. The identifier of the system information block or system information block group may be predefined or configured via RRC signaling.

For example: each system information block has a number, which is assumed to be SIB X, and the number can be used as an identifier of the system information block. Similarly, a number, which is assumed to be SI Y, can be explicitly assigned to a system information block group, and the number can be used as an identifier of the system information block. The system information block group can also be indicated in an implicit manner. For example, assuming that the first system information includes grouping information of the system information block group (i.e., SIBs included in each SI), the UE may use an order in which the SI appears as its identifier. The order of appearance may be an order of appearance only in the supplementary system information block group, or an order of appearance in all system information block groups.

Optionally, before sending the system information request message, the UE determines whether the cell (which may be a serving cell or a camping cell) has the requested supplementary system information and whether the requested supplementary system information is broadcast, for example, the UE determines these by acquiring the first system information.

It should be noted that a radio resource over which the UE sends the system information request message is not limited to the uplink resource obtained through the preamble sequence request/reply process (i.e., the uplink resource obtained through steps S10-S40), but may also be an uplink resource obtained in other manners, including but not limited to predefined, configured via RRC signaling, and allocated over a PDCCH. In these cases, steps S10-S40 may not be performed.

In one embodiment, the system information request message is an RRC message transmitted over an uplink CCCH logical channel. The system information request message may include an information element (for example, denoted as allOtherSIRequest) for requesting all the supplementary system information; the message may also include a list of supplementary system information blocks (for example, denoted as otherSIBRequestList), an element in the list indicating a system information block identifier or an identifier in one-to-one correspondence to the system information block identifier, for example, a binary string corresponding to the system information block (for example, SIB X1 corresponds to 000); the message may also include a list of supplementary system information block groups (for example, denoted as otherSIRequestList), one element in the list indicating a system information block group identifier. It should be noted that the information element used to request all or a part of the supplementary system information may be the same information element, and all or a part of the supplementary system information may be requested with different values of the cell.

In another embodiment, for UE in an RRC connected state, the system information request message may be an RRC message transmitted over an uplink DCCH logical channel. The system information request message may include an information element (for example, denoted as allOtherSIRequest) for requesting all the supplementary system information; the message may also include a list of supplementary system information blocks (for example, denoted as otherSIBRequestList), an element in the list indicating a system information block identifier or an identifier in one-to-one correspondence to the system information block identifier, for example, a binary string corresponding to the system information block (for example, SIB X1 corresponds to 000); the message may also include a list of supplementary system information block groups (for example, denoted as otherSIRequestList), one element in the list indicating a system information block group identifier. It should be noted that the information element used to request all or a part of the supplementary system information may be the same information element, and all or a part of the supplementary system information may be requested with different values of the cell.

Figure 2:
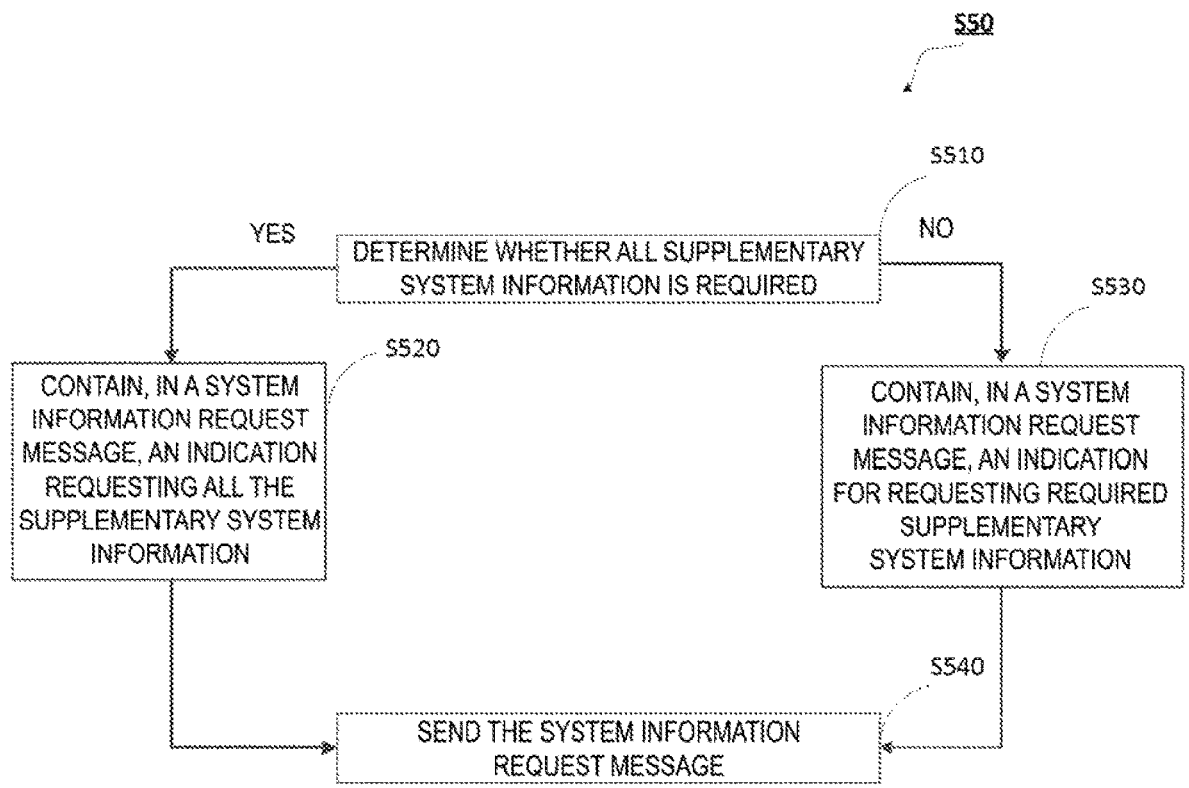
FIG. 2 shows an example of a step for sending an information system request message according to the present disclosure.

FIG. 2 shows an example of step S50 in accordance with the present disclosure. As shown, step S50 may further include:

Step S10: The UE determines whether the UE needs to request all the supplementary system information, and if yes, step S520 is performed; if not, the UE only needs to request partial supplementary system information, and then step S530 is performed.

It should be noted that if the operation of UE sending a message to request all the supplementary system information is not supported, step S510 and step S520 are not performed.

Step S520: The system information request message includes an indication for requesting all the supplementary system information (that is, the message indicates that all the supplementary system information is requested); for example, the value of the information element (allOtherSIRequest) corresponding to all the requested supplementary system information is set to "1" or "setup" or "true" or other predefined values.

Step S530: The system information request message includes an indication for requesting a required system information block and/or system information block group (that is, the message indicates supplementary system information that needs to be requested); for example, the value of the information element corresponding to the requested partial supplementary system information is set to an identifier of a corresponding system information block or an identifier of a corresponding system information block group.

Optionally, the system information request message further includes a UE identifier. Specifically, if an upper layer provides the UE identifier (for example, an S-TMSI) or an identifier for acquiring a UP context in the base station or another identifier for distinguishing the UP, the UP identifier is set to the identifier received from the upper layer; if the upper layer does not provide the UE identifier, a random number may be generated, and the UE identifier is set to the generated random number.

Optionally, it is also possible to carry a timestamp in the system information request message, for example, the timestamp is a current system time.

Step S540: Send the system information request message to a lower layer for transmission.

Optional, a first timer is started. The value of the first timer is predefined or is configured via RRC signaling.

It should be noted that if the UP is in an idle state, and if the UP identifier is included in the request message, the UP identifier to be sent may be encrypted, for example, encrypted using an asymmetric key, that is, the UP uses a public key of the base station for encryption. In this case, when receiving the request message, the base station first obtains the UE identifier by decryption, so as to determine whether the UE is legal. The base station (for example, an eNB) can communicate with a core network, and send the UP identifier to the core network, and the core network determines whether the UE is legal, and returns the result to the base station. The core network may also notify a base station in a certain area (for example, notify all base stations in a UP tracking area) of the UE identifier, so that the base station can use the UP identifier to determine whether the UE that sends the system information request message is legal UE. In this case, when the tracking area of the UE is updated, the core network will also notify the corresponding base station of the corresponding UP identifier. If the UE is in an RRC inactive state or an RRC connected state, and a corresponding security configuration is already used in the base station and the UP, the system information request message may be encrypted by using the security configuration information, but the UE identifier may not be encrypted. If the request message carries a timestamp, the timestamp can be encrypted.

Figure 3:
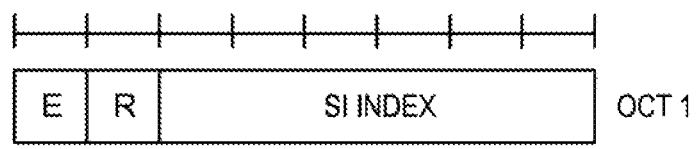
FIG. 3 is a schematic diagram of a MAC CE as a system information request message according to the present disclosure.

In another embodiment, the system information request message is one or more MAC CEs, and FIG. 3 shows an example of a MAC CE. In the MAC CE, E is an extension bit for indicating whether another MAC header is further included; R is a reserved bit and can be set to 0; a system information index (SI index) is used to indicate the requested supplementary system information. It should be noted that E and R may or may not exist, and a plurality of R bits may be present, and the number of bits occupied by the SI index is determined according to the number of system information blocks or system information block groups. A system information block or a system information block group may correspond to one SI index, or an SI index may be defined for requesting all the supplementary system information. The mapping relationship between the SI index and the system information may be predefined or configured via RRC signaling or implicitly indicated. For example, the order in which the system information appears in the first system information is in one-to-one correspondence with the SI index (in an ascending or descending order).

In one embodiment, the system information request response message is an RRC message transmitted on a downlink CCCH logical channel.

In another embodiment, the system information request response message is an RRC message transmitted on a downlink DCCH logical channel.

In another embodiment, the system information request response message is an RRC message transmitted on a downlink BCCH logical channel.

In one embodiment, in step S80, the UE receives a system information request response message indicating that the base station will broadcast the requested supplementary system information. The base station then broadcasts the requested supplementary system information and the UE receives the broadcast supplementary system information.

In one embodiment, in step S80, the UE receives a system information request response message indicating scheduling information of the requested supplementary system information. The base station sends the requested supplementary system information according to the scheduling information. Accordingly, the UE receives the requested system information according to the scheduling information.

In one embodiment, the system information request response message is a rejection message.

In one embodiment, the system information request response message includes the supplementary system information requested by the UE (for example, the supplementary system information requested by the UE is included in an information element rrc-SImessage, and the UE determines whether the received system information request response message includes the field). In this case, the UE performs a configuration corresponding to the requested supplementary system information (i.e., performs an operation that needs to be performed when the system information is received); if the requested message does not include the requested system information (i.e., indicating that the requested system information will be broadcast), for example, the response message does not include the information element rrc-SImessage), then the UE receives the broadcast supplementary system information Optionally, the base station determines, according to situations or the requested supplementary system information, whether to broadcast/schedule the requested supplementary system information, or to include the requested supplementary system information in the system information request response message. Correspondingly, the UE may determine, according to its type (or capability) or the type of the requested system information or the current RRC state, whether to send a CCCH or DCCH request message and receive a CCCH, DCCH, or BCCH reply message. For example, the system information is classified into two categories. If the UE requests the first category of system information, it receives the reply message transmitted on the CCCH; if the UE requests the second category of system information, it receives the reply message transmitted on the BCCH.

Optionally, if the system information request response message received by the UE does not include the system information requested by the UE, a second timer is started. The value of the second timer is predefined or is configured via RRC signaling.

Optionally, if the system information request response message received by the UE includes the system information requested by the LIE, the first timer is stopped.

Optionally, if the UE receives the system information request response message, the first timer is stopped.

Optionally, if the UE receives a system information request rejection message, a third timer is started, and when the third timer is running, the UE cannot send the system information request message again; only when the third timer expires, the UE can send the system information request message. The value of the third timer may be predefined or configured via RRC signaling or included in the system information request rejection message.

Optionally, if the UE receives the system information request rejection message, the following operations may be performed: resetting a MAC layer and releasing a MAC configuration; and/or notifying the upper layer of the failure in acquiring the system information.

It should be noted that, it can be determined according to different fields in the system information request response message whether the system information request response message is a system information request rejection message. For example, if the system information request response message includes the requested system information or includes an indication that the requested system information is to be broadcast/scheduled, the system information request response is not a system information request rejection message, otherwise it is a system information request rejection message.

Receiving/Sending of Supplementary System Information

Specifically, the UE may receive the requested supplementary system information in a corresponding scheduling period according to the scheduling information of the requested supplementary system information carried in the system information request response message. An SI-RNTI may be predefined or configured via RRC to monitor a PDCCH corresponding to the requested supplementary system information. The scheduling information may also not be included in the system information request response message, but is configured via RRC signaling (for example, it is included in the first system information). The operation that needs to be performed upon reception of the supplementary system information is performed according to the received supplementary system information. Optionally, the first timer or the second timer is stopped when the supplementary system information is received.

Optionally, when the first timer or the second timer expires, the failure of system information acquisition is indicated to the upper layer. Optionally, before the failure of system information acquisition is informed to the upper layer, it is determined whether the number of times that the system information request message is sent reaches a set maximum number of times for sending. The maximum number of times for sending is predefined or is configured via RRC signaling (e.g., included in the first system information). If the maximum number of times for sending is not reached, the UE may repeat step S50 to continue requesting the required supplementary system information.

Embodiment 2

Figure 4:
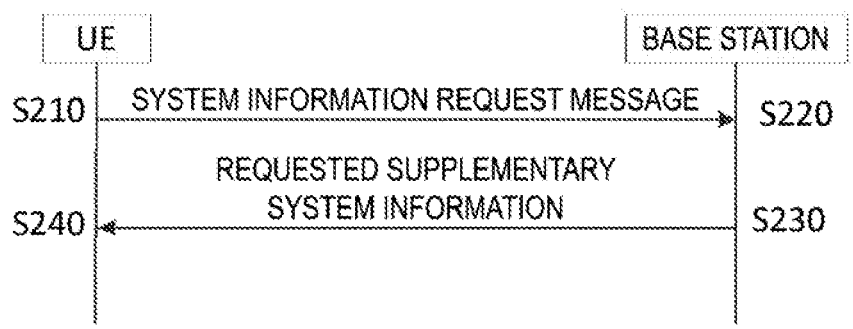
FIG. 4 is a flowchart of a method for acquiring supplementary information according to Embodiment 2 of the present disclosure.

According to the present disclosure, the UE may also use a random access process to receive supplementary system information. FIG. 4 is a flowchart of a method for acquiring supplementary information according to Embodiment 2 of the present disclosure. Operations of a media access control layer when the UE receives the supplementary system information by using a random access process are described below with reference to FIG. 4.

At step S210, the UP sends a system information acquisition request and starts a fourth timer; the value of the fourth timer is predefined or is configured via RRC signaling.

In one embodiment, if the supplementary system information can only be sent in a starting subframe of a system information change period (e.g., assuming that the base station receives the system information request message in the nth system information change period, the base station will send requested system information in the next system information change period), the fourth timer is a time window in which the UE receives the requested system information; the value of the time window may be set to a multiple of the system information change period. Preferably, a starting position of the time window is a starting subframe of a next change period after the request message is sent. Alternatively, the starting position of the time window is the last subframe for sending the system information request message plus one offset. The value of the offset is predefined or is configured via RRC signaling.

In another embodiment, the value of the fourth timer is a time window in which the UP receives the requested system information. The value of the time window is a multiple of a sending period of the first system information for scheduling the requested system information. Preferably, a starting position of the time window is a starting subframe of a next sending period after the request message is sent. Alternatively, the starting position of the time window is the last subframe for sending the system information request message plus one offset. The offset value is predefined or is configured via RRC signaling.

It should be noted that the first timer may also be a time window, and the value and a starting position of the time window may be the same as those of the fourth timer, Optionally, the starting position of the time window may be a time when the UE sends the system information request message to a lower layer (that is, when the system information request message is sent to the tower layer, the first timer is started).

At step S220, the base station receives the system information request message sent by the UE. Next, at step S230, the base station sends the requested supplementary system information.

At step S240, the UE receives the requested supplementary system information within the defined time window (or when the fourth timer is running).

In one embodiment, if a notification of receiving PDCCH transmission from the lower layer is received and a C-RNTI MAC CE is carried in the system information request message, the fourth timer is stopped.

In one embodiment, if the UE receives a PDCCH that is scrambled by an RNTI for the system information request message (denoted as an SIR-RNTI), the fourth timer is stopped. Optionally, it is also necessary to determine whether the received reply message includes the system information requested by the UE or an indication that the system information requested by the UE is to be sent (e.g., broadcast), and if so, the fourth timer is stopped.

In one embodiment, if the UE receives a PDCCH that is scrambled by a Temporary C-RNTI, the fourth timer is stopped. Optionally, it is also necessary to determine whether the received reply message includes the system information requested by the UE or an indication that the system information requested by the UE is to be broadcast, and if so, the fourth timer is stopped.

When the fourth timer expires, if the number of times of preamble sequence transmissions has reached a maximum number of times of transmissions plus 1, the upper layer is informed of a failure of system information acquisition.

Figure 5:
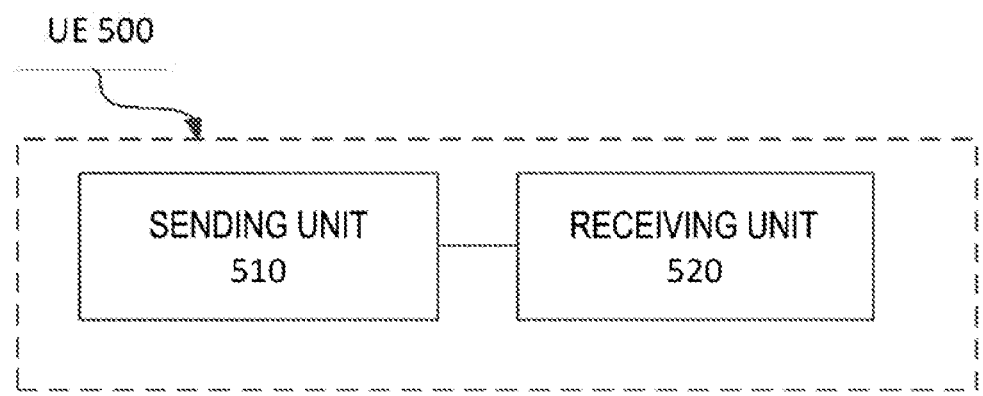
FIG. 5 is a block diagram of user equipment according to Embodiment 1 of the present disclosure.

In accordance with Embodiment 1 described above, the present disclosure provides user equipment (UE). FIG. 5 is a block diagram of UE 500 according to Embodiment 1 of the present disclosure. As shown, UE 500 includes: a sending unit 510 configured to send a preamble sequence to a base station to request supplementary system information; and a receiving unit 520 configured to receive a reply message from a base station.

In one embodiment, the preamble sequence comprises a plurality of preamble sequences respectively corresponding to different system information blocks/system information block groups, and the sending unit 510 is further configured to: select, from the plurality of preamble sequences, a preamble sequence corresponding to a system information block/system information block group required by the UE for sending.

In one embodiment, the preamble sequence includes a plurality of preamble sequences respectively corresponding to different system information blocks/system information block groups, and one of the plurality of preamble sequences corresponds to all the supplementary system information; when the UE needs all the supplementary system information, the sending unit 510 is further configured to: select, from the plurality of preamble sequences, the preamble sequence corresponding to all the supplementary system information for sending.

In one embodiment, a corresponding relation between the plurality of preamble sequences and the system information blocks/the system information block groups is predefined or is configured via RRC signaling.

In one embodiment, the corresponding relation is that: one preamble sequence corresponds to one system information block; or one preamble sequence corresponds to one system information block group.

In one embodiment, the preamble sequence comprises a plurality of preamble sequences, and the sending unit 510 is further configured to: select, according to the number of required system information blocks/system information block groups, a corresponding number of preamble sequences for sending.

In one embodiment, the sending unit 510 is further configured to send the preamble sequence on a resource configured via RRC signaling for sending the requested supplementary system information.

In one embodiment, different resources are configured to request different system information blocks/system information block groups, wherein the sending unit 510 is further configured to send the preamble sequence on a corresponding resource according to the system information block/system information block group required by the UE.

In one embodiment, the reply message indicates that the base station will broadcast the requested system information block/system information block group, and the receiving unit 520 is further configured to receive the broadcast system information block/system information block group.

In one embodiment, the reply message indicates scheduling information of the requested system information block/system information block group, and the receiving unit 520 is further configured to receive the requested system information block/system information block group according to the scheduling information.

In one embodiment, the scheduling information is pre-configured via RRC signaling, and the reply message indicates that the requested system information block/system information block group will be scheduled according to the pre-configured scheduling information, and the receiving unit 520 is further configured to receive the requested system information block/system information block group according to the pre-configured scheduling information.

In one embodiment, the reply message indicates an allocated uplink resource, and the UE is authorized to send a system information request message on the uplink resource so as to request the required supplementary system information from the base station.

In one embodiment, the sending unit 510 is further configured to send the system information request message on the allocated uplink resource, the system information request message indicating the required system information block/system information block group.

In one embodiment, the system information request message includes an indication that indicates that all the supplementary system information is required.

In one embodiment, the system information request message is an RRC message transmitted on an uplink CCCH logical channel or an uplink DCCH logical channel.

In one embodiment, the system information request message includes a UE identifier.

In one embodiment, the UE identifier is an identifier received from an upper layer or a random number generated by the UE.

In one embodiment, the system information request message is one or more MAC CEs.

In one embodiment, the receiving unit 520 is further configured to receive a system information request response message in response to the sending of the system information request message, the system information request response message being an RRC message transmitted on a downlink CCCH logical channel or a downlink DCCH logical channel or a downlink BCCH logical channel.

In one embodiment, the system information request response message includes the requested system information block/system information block group.

In one embodiment, the system information request response message indicates that the base station will broadcast the requested system information block/system information block group, and the receiving unit 520 is further configured to receive a broadcast system information block/system information block group.

In one embodiment, the system information request response message indicates scheduling information of the requested system information block/system information block group, and the receiving unit 520 is further configured to receive the requested system information block/system information block group according to the scheduling information.

Figure 6:
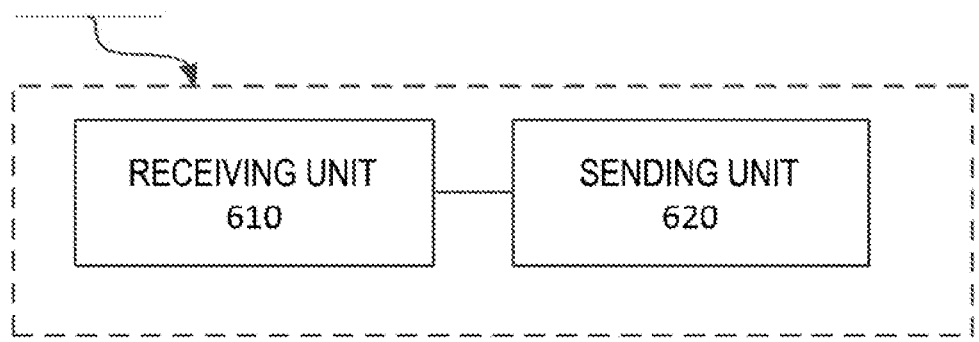
FIG. 6 is a block diagram of a base station according to Embodiment 1 of the present disclosure.

In accordance with the Embodiment 1 described above, the present disclosure provides a base station. FIG. 6 is a block diagram of a base station 600 according to Embodiment 1 of the present disclosure. As shown, the base station 600 includes: a receiving unit 610 configured to receive a preamble sequence requesting supplementary system information from UE; and a sending unit 620 configured to send a reply message to the UE.

In one embodiment, the preamble sequence includes a plurality of preamble sequences that correspond to different system information blocks/system information block groups, respectively, and the sending unit 620 is further configured to include, in the reply message, a system information block/system information block group corresponding to the received preamble sequence.

In one embodiment, the preamble sequence includes a plurality of preamble sequences that correspond to different system information blocks/system information block groups, respectively, and the sending unit 620 is further configured to send a reply message to the UE, the reply message indicating that the requested system information block/system information block group is to be broadcast.

In one embodiment, the sending unit 620 is further configured to broadcast the requested system information block/system information block group.

In one embodiment, the preamble sequence includes a plurality of preamble sequences that correspond to different system information block/system information block groups, respectively, and the sending unit 620 is further configured to: send, to the UE, a reply message indicating scheduling information of the requested system information block/system information block group; and send the requested system information block/system information block group in accordance with the scheduling information.

In one embodiment, different resources are configured to request different system information blocks/system information block groups by the UE, and the sending unit 620 is further configured to determine, according to a resource receiving the preamble sequence, the supplementary system information required by the UE for sending.

In one embodiment, the reply message includes an uplink resource allocated to the UE, and the UE is authorized to send a system information request message on the uplink resource so as to request the required supplementary system information.

In one embodiment, the receiving unit 610 is further configured to receive the system information request message sent by the UE on the allocated uplink resource so as to request the required supplementary system information.

In one embodiment, the sending unit 620 is further configured to send a system information request response message in response to the receiving of the system information request message.

In one embodiment, the system information request response message is an RRC message transmitted on a downlink CCCH logical channel or a downlink DCCH logical channel or a downlink BCCH logical channel.

In one embodiment, the system information request response message includes the requested system information block/system information block group.

In one embodiment, the system information request response message indicates that the requested system information block/system information block group is to be broadcast and the sending unit 620 is further configured to broadcast the system information block/system information block group.

In one embodiment, the system information request response message indicates scheduling information of the requested system information block/system information block group, and the sending unit 620 is further configured to send the requested system information block/system information block group according to the scheduling information.

The other various embodiments described above with reference to Embodiment 1 are also applicable to UE 500 and base station 600.

Figure 7:
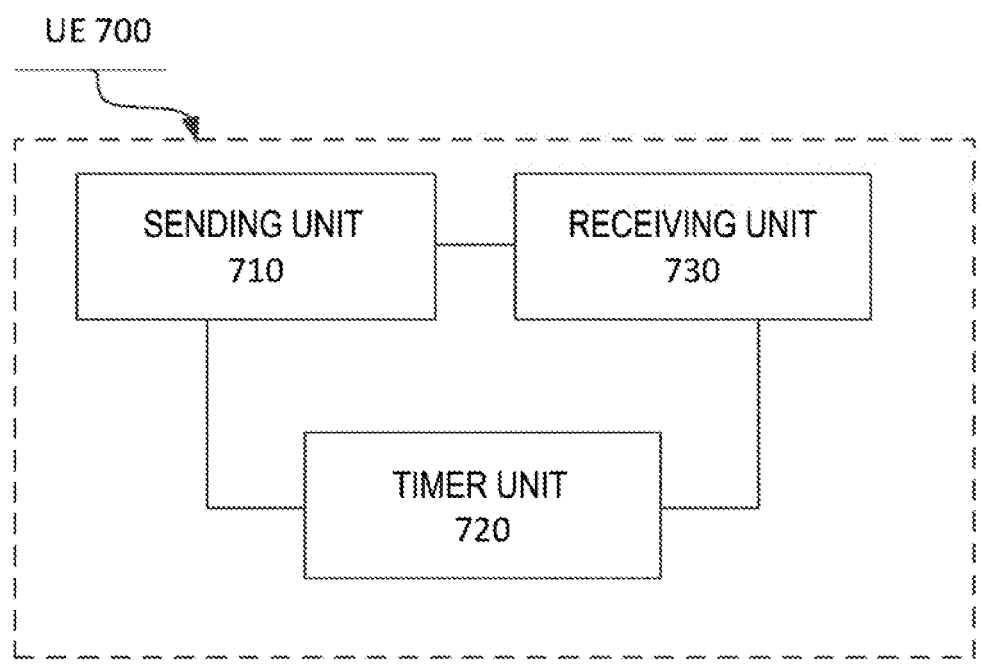
FIG. 7 is a block diagram of user equipment according to Embodiment 2 of the present disclosure.

In accordance with Embodiment 2 described above, the present disclosure provides user equipment (UE). FIG. 7 is a block diagram of UE 700 according to Embodiment 2 of the present disclosure. As shown, the UE 700 includes: a sending unit 710, configured to send a system information request message to a base station so as to request required supplementary system information; a timer unit 720, configured to start a timer while the sending unit 710 sends the system information request message to the base station; and a receiving unit 730, configured to receive the requested supplementary system information within a time window defined by the timer.

In one embodiment, the value of the time window is set to a multiple of a system information change period.

In one embodiment, a starting position of the time window is set to a starting subframe of a next system information change period after the system information request message is sent.

In one embodiment, the starting position of the time window is set to the last subframe of the system information request message plus one offset, and the value of the offset is predefined or is configured via RRC signaling.

In one embodiment, the value of the time window is set to a multiple of a minimum system information sending period for scheduling of the requested supplementary system information.

In one embodiment, the starting position of the time window is set to a starting subframe of a next sending period after the system information request message is sent.

In one embodiment, the starting position of the time window is set to the last subframe of the system information request message plus one offset, and the value of the offset is predefined or is configured via RRC signaling.

Figure 8:
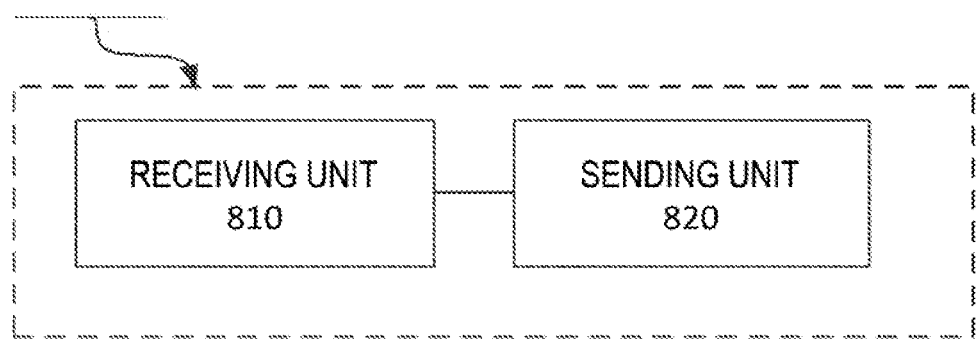
FIG. 8 is a block diagram of a base station according to Embodiment 2 of the present disclosure.

In accordance with Embodiment 2 described above, the present disclosure provides a base station. FIG. 8 is a block diagram of a base station 800 according to Embodiment 2 of the present disclosure. As shown, the base station 800 includes: a receiving unit 810, configured to receive a system information request message from UE, the system information request message requesting supplementary system information required by the UE; and a sending unit 820, configured to send the requested supplementary system information to the UE in response to the receiving of the system information request message.

The other various embodiments described above with reference to Embodiment 2 are also applicable to the UE 700 and the base station 800.

It should also be noted that the user equipment and base stations described in FIGS. 5-8 are only drawings for those skilled in the art to understand the present invention more clearly, in which some of the units/components that are not essential to the understanding of the present invention are omitted, and the scope of protection of the present invention should not be limited by the specific details of these drawings. For example, more units/components such as a display, an operation and maintenance interface, an antenna, and the like may be included in actual production devices. As such, the various units in FIGS. 5-8 can also be implemented by using more or fewer units/components.

It should be understood that the above embodiments of the present invention may be implemented through software, hardware or a combination of software and hardware. For example, various components within the base station and user equipment in the above embodiments can be implemented through various devices or circuits, and these devices include, but are not limited to: an analog circuit device, a digital circuit device, a digital signal processing (DSP) circuit, a programmable processor, an application specific integrated circuit (ASIC), a field programmable gate array (FPGA), and a complex programmable logic device (CPLD), and the like.

In addition, the embodiments of the present invention, disclosed here, may be implemented on a computer program product. More specifically, the computer program product is a product described as below. The product has a computer-readable medium on which a computer program logic is encoded. The computer program logic provides relevant operations to implement the above-described technical solution of the present invention when the product is executed on a computing device. The computer program logic enables a processor to execute the operations (methods) described in the embodiments of the present invention when the product s executed on at least one processor of a computing system. Such an arrangement of the present invention is typically provided as software, a code, and/or other data structures that are configured or encoded on a computer-readable medium, such as a light medium (e.g., a CD-ROM), a floppy disk or a hard disk, or, for example, firmware or other media of microcodes on one or more ROM or RAM or PROM chips, or downloadable software images, shared database and so on in one or more modules. Software or firmware or such configuration may be installed on a computing device such that one or more processors in the computing device perform the technical solutions described in the embodiments of the present invention.

The embodiments of the invention disclosed herein may be implemented as a program running on the device according to the present invention. The program running on the device according to the present invention may be a program that enables the computer to implement the functions of the embodiments of the present invention by controlling the central processing unit (CPU). The program or information processed by the program can be stored temporarily in volatile memory (e.g., random access memory RAM), hard disk drive (HDD), non-volatile memory (e.g., flash memory), or other memory systems.

Although the present invention has been shown in connection with the preferred embodiments of the present invention, it will be understood by those skilled in the art that various modifications, substitutions and alterations may be made to the present invention without departing from the spirit and scope of the present invention. Accordingly, the present invention should not be defined by the above-described embodiments, but should be defined by the appended claims and their equivalents.

The invention claimed is:

1. A method performed by UE comprising:
setting an information element to indicate a list of requested system information block groups as contents of a system information request message which is transmitted on an uplink common control channel (CCCH) logical channel, wherein the system information request message is a radio resource control (RRC) message, wherein the list is set according to an order of the system information block groups configured in first system information which is periodically broadcasted, wherein a first element in the list identifies a system information block group; and
submitting the system information request message to lower layers for transmission.

2. The method according to claim 1, further comprising:
receiving the system information block groups transmitted on a downlink broadcast control channel (BCCH) logical channel.

3. The method according to claim 1, wherein the radio resource control (RRC) message is submitted to lower layers by an RRC layer of a control plane protocol stack of the UE.

4. The method according to claim 1, wherein the radio resource control (RRC) message is generated in a radio resource control (RRC) layer of a control plane protocol stack of the UE.

5. The according to claim 1, wherein a second element in the list identifies a system information block.

6. A method performed by a base station comprising:
broadcasting first system information periodically; and
receiving, on an uplink common control channel (CCCH) logical channel, a system information request message that is generated in a radio resource control (RRC) layer of a control plane protocol stack of a user equipment and submitted to lower layers for transmission, wherein:
the system information request message is a radio resource control (RRC) message and indicates a list of requested system information block groups, and wherein a first element in the list identifies a system information block group; and
the list is set according to an order of the system information block groups configured in the first system information.

7. The method according to claim 6, further comprising:
sending the system information block groups on a downlink broadcast control channel (BCCH) logical channel.

8. The according to claim 6, wherein a second element in the list identifies a system information block.

9. A user equipment, comprising:
a setting circuitry configured to set an information element to indicate a list of requested system information block groups as contents of a system information request message that is generated in a radio resource control (RRC) layer of a control plane protocol stack of the user equipment and transmitted on an uplink common control channel (CCCH) logical channel, wherein the system information request message is a radio resource control (RRC) message, wherein the list is set according to an order of the system information block groups configured in first system information which is periodically broadcasted, and wherein a first element in the list identifies a system information block group; and
a submitting circuitry configured to submit the system information request message to lower layers for transmission.

10. The user equipment according to claim 9, further comprising:
a receiving circuitry configured to receive the system information block groups transmitted on a downlink broadcast control channel (BCCH) logical channel.

11. The user equipment according to claim 9, wherein the system information request message is submitted to lower layers by the RRC layer.

12. The user equipment according to claim 9, wherein a second element in the list identifies a system information block.

13. A base station, comprising:
a broadcasting circuitry configured to broadcast first system information periodically;
a receiving circuitry configured to receive, on an uplink common control channel (CCCH) logical channel, a system information request message that is generated in a radio resource control (RRC) layer of a control plane protocol stack of a user equipment and submitted to lower layers for transmission, wherein:
the system information request message is a radio resource control (RRC) message and includes an information element which indicates a list of requested system information block groups; and
the list is set according to an order of the system information block groups configures in the first system information, and wherein a first element in the list identifies a system information block group.

14. The base station according to claim 13, further comprising:
a sending circuitry configured to send the system information block groups on a downlink broadcast control channel (BCCH) logical channel.

15. The base station according to claim 13, wherein a second element in the list identifies a system information block.

* * * * *